United States Patent
Degarmo et al.

(10) Patent No.: US 11,192,032 B2
(45) Date of Patent: *Dec. 7, 2021

(54) SYSTEM AND METHOD FOR SESSION MANAGEMENT IN A MULTIPLAYER NETWORK GAMING ENVIRONMENT

(71) Applicant: TAKE-TWO INTERACTIVE SOFTWARE, INC., New York, NY (US)

(72) Inventors: Philip Degarmo, Carlsbad, CA (US); Robert Schmitz, Carlsbad, CA (US)

(73) Assignee: TAKE-TWO INTERACTIVE SOFTWARE, INC., New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 17/033,231

(22) Filed: Sep. 25, 2020

(65) Prior Publication Data

US 2021/0016181 A1 Jan. 21, 2021

Related U.S. Application Data

(63) Continuation of application No. 15/807,371, filed on Nov. 8, 2017, now Pat. No. 10,814,233.

(51) Int. Cl.
| | |
|---|---|
| A63F 13/00 | (2014.01) |
| A63F 9/24 | (2006.01) |
| A63F 13/79 | (2014.01) |
| A63F 13/77 | (2014.01) |
| A63F 13/55 | (2014.01) |
| A63F 13/352 | (2014.01) |

(52) U.S. Cl.
CPC .......... *A63F 13/79* (2014.09); *A63F 13/352* (2014.09); *A63F 13/55* (2014.09); *A63F 13/77* (2014.09); *A63F 2300/5533* (2013.01)

(58) Field of Classification Search
CPC ........ A63F 13/30; A63F 13/33; A63F 13/335; A63F 13/35; A63F 13/352; A63F 13/55; A63F 13/77; A63F 13/85; A63F 13/87; H04L 67/14; H04L 51/04; H04L 69/16
See application file for complete search history.

(56) References Cited

U.S. PATENT DOCUMENTS

| | | | |
|---|---|---|---|
| 6,755,743 B1 | 6/2004 | Yamashita et al. | |
| 6,807,562 B1 | 10/2004 | Pennock et al. | |
| 7,092,399 B1 | 8/2006 | Cheriton | |
| 7,686,693 B2 | 3/2010 | Danieli et al. | |
| 7,716,289 B2 | 5/2010 | Malik | |
| 7,877,450 B2 | 1/2011 | Odell et al. | |
| 7,945,620 B2 | 5/2011 | Bou-Ghannam et al. | |
| 10,814,233 B2 * | 10/2020 | Degarmo | A63F 13/79 |
| 2001/0002192 A1 | 5/2001 | Fujita | |

(Continued)

*Primary Examiner* — Milap Shah
(74) *Attorney, Agent, or Firm* — Orrick, Herrington & Sutcliffe LLP

(57) ABSTRACT

Disclosed are systems and methods for session management. The disclosed system allows for seamless merging and splitting of network sessions in a multiplayer network gaming environment. Seamless session management allows dynamic movement of players in a virtual world during gameplay without unnecessary loading and/or stalling. As the players in the virtual world move around, the management of active game sessions can be improved to effect a more realistic perceived population.

15 Claims, 15 Drawing Sheets

(56) References Cited

U.S. PATENT DOCUMENTS

| | | |
|---|---|---|
| 2003/0228909 A1 | 12/2003 | Tanaka et al. |
| 2004/0078444 A1 | 4/2004 | Malik |
| 2006/0035656 A1 | 2/2006 | Sung et al. |
| 2009/0186700 A1 | 7/2009 | Konkle |
| 2009/0198664 A1 | 8/2009 | Hamilton, II et al. |
| 2009/0254667 A1 | 10/2009 | Li et al. |
| 2010/0318665 A1 | 12/2010 | Demmer et al. |
| 2012/0137231 A1 | 5/2012 | Maxfield et al. |
| 2013/0296045 A1 | 11/2013 | Dun et al. |
| 2014/0012981 A1 | 1/2014 | Samuell et al. |
| 2014/0047094 A1 | 2/2014 | Yao et al. |

\* cited by examiner

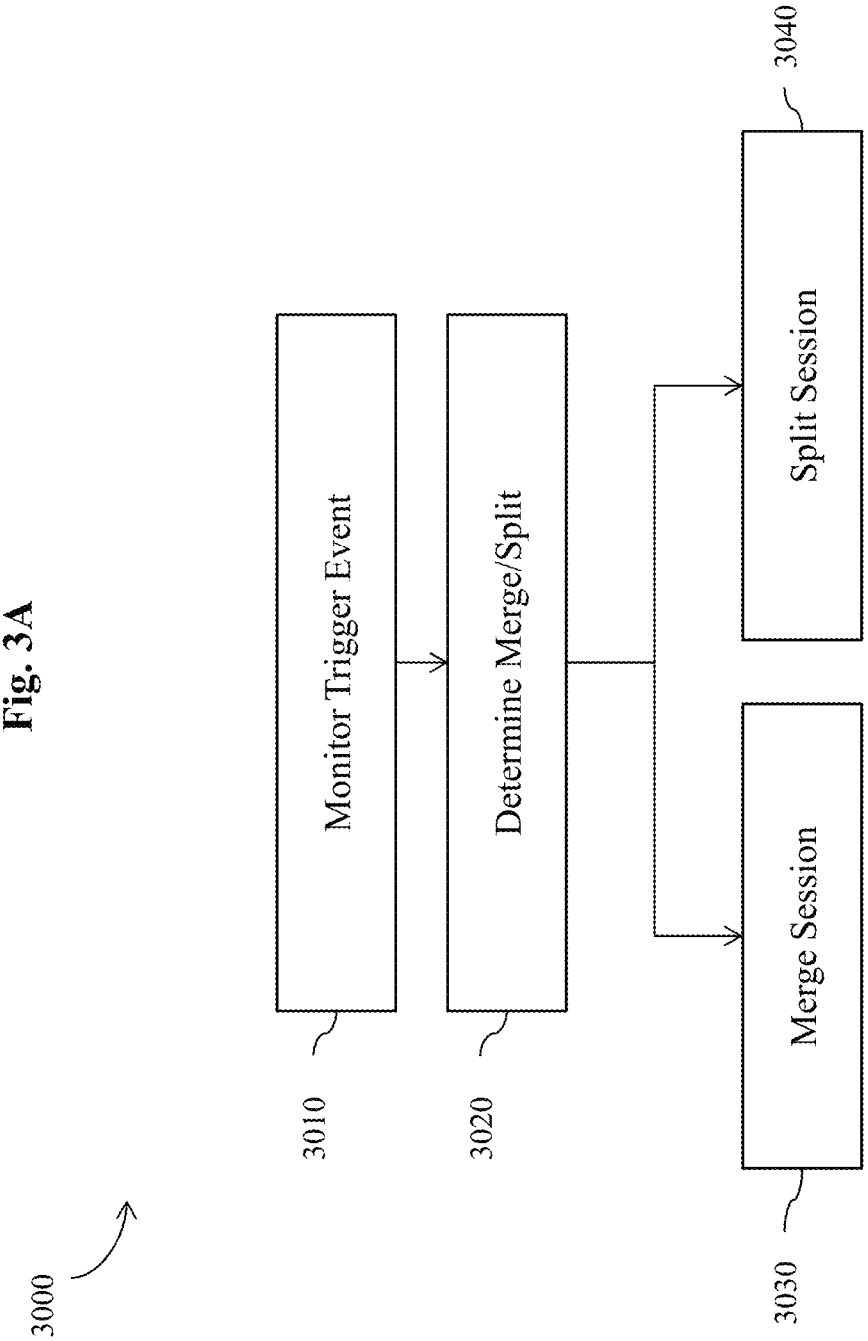

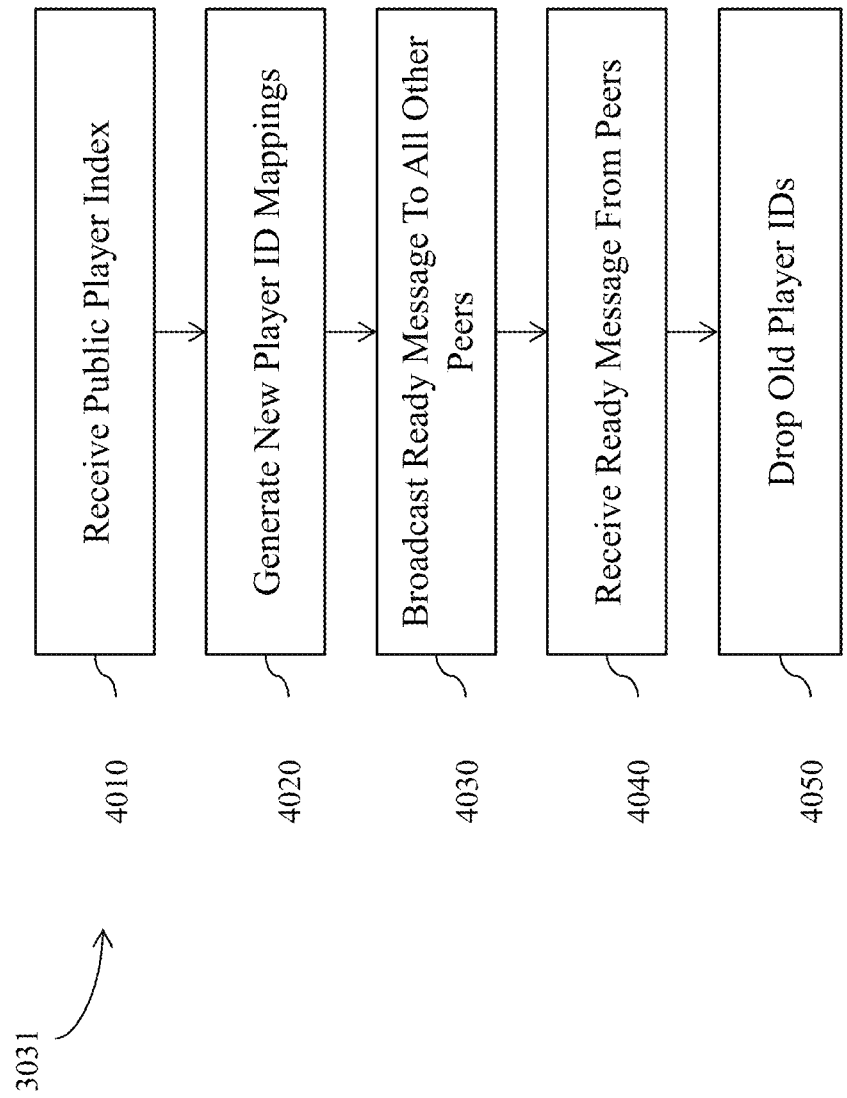

| Object | Private ID | Public ID |
|---|---|---|
| 202A | 1 | 1 |
| 202B | 2 | 2 |
| 202C | 3 | 3 |

201B

| Object | Private ID | Public ID |
|---|---|---|
| 202D | 3 | 3 |
| 202E | 4 | 4 |
| 202F | 5 | 5 |

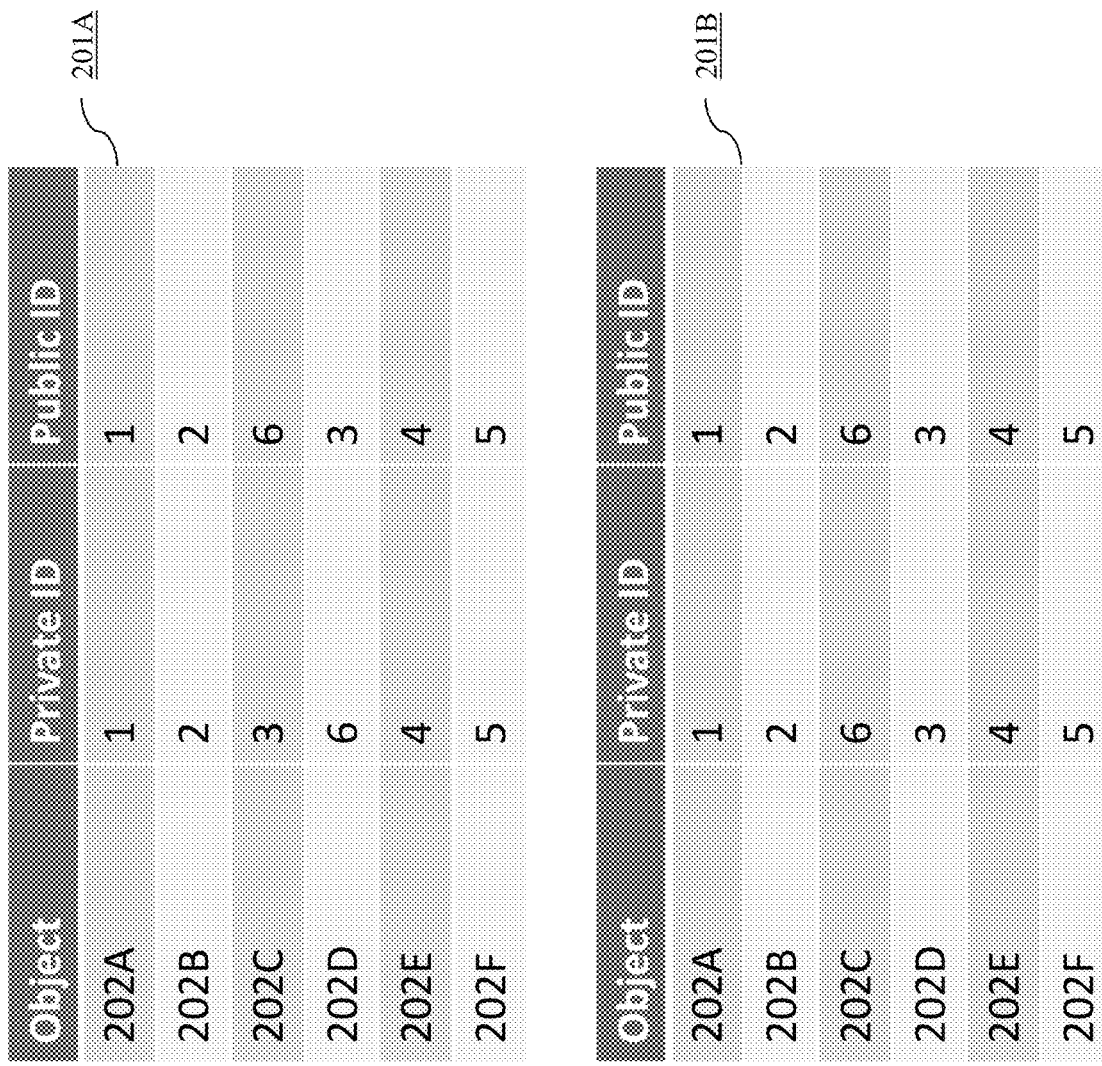

| Object | Private ID | Public ID |
|---|---|---|
| 202A | 1 | 1 |
| 202B | 2 | 2 |
| 202C | 3 | 6 |
| 202D | 4 | 3 |
| 202E | 5 | 4 |
| 202F | 6 | 5 |

201B

| Object | Private ID | Public ID |
|---|---|---|
| 202A | 1 | 1 |
| 202B | 2 | 2 |
| 202C | 6 | 6 |
| 202D | 3 | 3 |
| 202E | 4 | 4 |
| 202F | 5 | 5 |

| Object | Private ID | Public ID | Known By | Owned By |
|---|---|---|---|---|
| 202A | 1000 | 1000 | 101A | 101A |

201B

| Object | Private ID | Public ID | Known By | Owned By |
|---|---|---|---|---|
| 202B | 1000 | 1000 | 101B | 101B |
| 202C | 1001 | 1001 | 101B, 101C | 101C |
| 202D | 1002 | 1002 | 101B, 101C | 101B? 101C? |
| 202E | 1003 | 1003 | 101B, 101C | |

| Object | Object ID | New ID | Known By | Owned By |
|---|---|---|---|---|
| 202B | 1000 | | 101B | 101B |
| 202C | 1001 | | 101B, 101C | 101C |
| 202D | 1002 | 2000 | 101B, 101C | 101B? |
| 202E | 1003 | 2001 | 101B, 101C | |

⇔

101C

| Object | Object ID | New ID | Known By | Owned By |
|---|---|---|---|---|
| 202B | 1000 | | 101B | 101B |
| 202C | 1001 | | 101B, 101C | 101C |
| 202D | 1002 | 3000 | 101B, 101C | 101C? |
| 202E | 1003 | 3001 | 101B, 101C | |

Fig. 7C 201B 101B

| Object | Object ID | New ID | Known By | Owned By |
|---|---|---|---|---|
| 202B | 1000 | 2000 | 101B | 101B |
| 202C | 1001 | | 101B, 101C | 101C |
| 202D | 1002 | 2001 | 101B, 101C | 101B? |
| 202E | 1003 | 2002 | 101B, 101C | |

101C

| Object | Object ID | New ID | Known By | Owned By |
|---|---|---|---|---|
| 202B | 1000 | 3000 | 101B | 101B |
| 202C | 1001 | 3001 | 101B, 101C | 101C |
| 202D | 1002 | | 101B, 101C | 101C? |
| 202E | 1003 | 3002 | 101B, 101C | |

Fig. 7D

| Object | Object ID | New ID | Known By | Owned By |
|---|---|---|---|---|
| 202B | 1000 | 2000 | 101B | 101B |
| 202C | 1001 | 3000 | 101B, 101C | 101C |
| 202D | 1002 | 2001 | 101B, 101C | 101B |
| 202E | 1003 | 2002 | 101B, 101C | 101B |

Fig. 7E

Table 201A:

| Object | Object ID | Private ID | Known By | Owned By |
|---|---|---|---|---|
| 202A | 1000 | 1000 | 101A | 101A |

Table 201B:

| Object | Object ID | Private ID | Known By | Owned By |
|---|---|---|---|---|
| 202B | 2000 | 1000 | 101B | 101B |
| 202C | 3000 | 1001 | 101B, 101C | 101C |
| 202D | 2001 | 1002 | 101B, 101C | 101B |
| 202E | 2002 | 1003 | 101B, 101C | 101B |

Fig. 7F

| Object | Private ID | Public ID |
|---|---|---|
| 202A | 1000 | 1000 |
| 202B | 2000 | 2000 |
| 202C | 3000 | 3000 |
| 202D | 2001 | 2001 |
| 202E | 2002 | 2002 |

101A

| Object | Private ID | Public ID |
|---|---|---|
| 202A | 2000 | 1000 |
| 202B | 1000 | 2000 |
| 202C | 1001 | 3000 |
| 202D | 1002 | 2001 |
| 202E | 1003 | 2002 |

101B/C

SYSTEM AND METHOD FOR SESSION MANAGEMENT IN A MULTIPLAYER NETWORK GAMING ENVIRONMENT

CROSS-REFERENCE TO RELATED APPLICATIONS

This application is a continuation of and claims priority to U.S. patent application Ser. No. 15/807,371, which was filed Nov. 8, 2017. The disclosure of the Patent Application is herein incorporated by reference in its entirety and for all purposes.

FIELD

The present application relates to management of a community of players in an online gaming environment. More specifically, the present disclosure describes computerized systems, methods, and apparatuses for improved multiplayer gameplay through an improved session management system. While the invention is disclosed with respect to an online multiplayer game experience, it could also be applied to other communities such as file/content sharing, online social networking environment, or any system requiring the management of large user populations over the Internet.

BACKGROUND

Many videogames offer an online multiplayer mode in addition to a storyline mode. The commercial success of many videogames can be attributable, to some degree, on the multiplayer offering of the videogame. Online multiplayer games have become so popular that some games have communities as large as several million players.

Given the large community of players, management of network technology and resources can pose a significant problem in creating a realistic virtual world. For example, video game players who are physically separated can interact with each other in the virtual world by participating in the same network session. A network session allows information exchange between players in the same virtual world, analogous to opening up a dialogue between the players in the virtual world. In conventional massively multiplayer online (MMO) systems, a single session (or one session per shared server or cluster of servers) is used to avoid conflicts or game inconsistencies that can exist across multiple sessions.

As virtual space in the world becomes larger, more players must occupy the space for the world to feel populated. This can pose a problem in conventional MMO games that use a single session. For example, in order to accommodate the very large player count, simulation fidelity must be limited to make the simulation computationally feasible. Fidelity can manifest in terms of animation quality, amount of things that a player can do, the degree of accuracy in the physical simulation, number of things in the world, etc. In addition, a server must be aware of the entire game state, further increasing computational requirements and limiting the maximum player count that can share the space.

In other conventional approaches, players are divided into multiple sessions. In order to limit the required level of computation and network traffic to feasible levels, the number of players that can participate in each session must be limited. This is especially the case when game information is exchanged directly between users without the central server (e.g., peer-to-peer), as the nature of the users' consoles (i.e., a peer) can further limit available computation and network bandwidth. In some cases, user consoles can only support a very limited, relatively small number of players (~fifty) in a single session. However, this can pose a problem when many players in the virtual world begin to congregate in the same virtual area of a map, for instance. Players in different sessions may not interact with players in a selected session, despite being present in the same virtual area. Accordingly, the virtual world does not feel as large as it should be and players may feel disconnected from certain aspects of the game. In other words, a lower maximum player count causes the virtual world to feel more empty than desired.

This is necessary in conventional systems because if a player from each of these sessions was able to interact with other players from other sessions, one player may see the other player walk through a closed door. For example, this is because a door may be open in one of the sessions and closed in another session. In other words, the two sessions can have a conflicting state that conventional games cannot resolve.

Alternatively, some conventional approaches provide the illusion of a single, large populated world having multiple network sessions by replacing a player's current session with a completely new session during gameplay. However, in order to maintain consistency and to provide the users a life-like experience when moving around the virtual world, the replacement of a session must be limited. For example, to prevent a player from noticing a wholesale replacement of their sessions (e.g., a closed door being replaced with an open door), the replacement of the session must be limited, for example, to when the player is in a confined space such that the player's visibility is heavily obscured. However, this places substantial restrictions on the game design to include these areas and limitations must be put in place to prevent objects and other players from entering this area.

Thus, an effective session management system must consider many factors (e.g., player visibility, geography, team management, networking resources, and so on) for merging and splitting sessions. In view of the foregoing, a need exists for a system and method for seamless session management to overcome the aforementioned obstacles and deficiencies of conventional multiplayer systems.

BRIEF SUMMARY

Innovative systems and methods for session management are disclosed for providing a multiplayer game with seamless splitting and merging of network sessions. The disclosed systems and methods are applicable for use with any online community, and while it is disclosed with respect to an online multiplayer game experience, they could be applied to other communities such as file/content sharing, online social networking environment, or any system requiring the management of large user populations over the Internet.

BRIEF DESCRIPTION OF THE DRAWINGS

FIG. 3A is flow chart outlining the session management of the sessions of FIG. 2 using the network multiplayer gaming environment of FIG. 1;

FIG. 4 is flow chart outlining the conflict resolution of player IDs of the merge process of FIG. 3B;

FIG. 6A is an exemplary table illustrating one embodiment of one or more sessions that can be merged using the network multiplayer gaming environment of FIG. 1;

FIG. 6B is an exemplary table illustrating one embodiment of the sessions of FIG. 6A following a merge;

FIG. 6C is an exemplary table illustrating another embodiment of the sessions of FIG. 6A following a merge;

FIG. 7A is an exemplary table illustrating one embodiment of one or more sessions and their respective player consoles that can be merged using the network multiplayer gaming environment of FIG. 1;

FIG. 7B is an exemplary table illustrating one embodiment of a selected session of FIG. 7A;

FIG. 7C is an exemplary table illustrating another embodiment of the selected session of FIG. 7B and the communication between one or more player consoles;

FIG. 7D is an exemplary table illustrating another embodiment of the selected session of FIG. 7B following a resolution between one or more player consoles;

FIG. 7E is an exemplary table illustrating one embodiment of the sessions of FIG. 7A before a merge; and FIG. 7F is an exemplary table illustrating another embodiment of the sessions of FIG. 7A following a merge.

DETAILED DESCRIPTION

The present disclosure describes a number of methods and computerized systems for seamless session management of a multiplayer network gaming community. Since currently-available multiplayer gaming systems are deficient because they cannot support the interaction between unique sessions without increasing computational resources and/or restricting game development/design, a system for session management that provides a seamless session merging and splitting can prove desirable and provide a basis for a wide range of network applications, such as creating a realistic virtual world that is not limited by hardware and software limitations. This result can be achieved, according to one embodiment disclosed herein, by a session management system 100 as illustrated in FIG. 1.

Figure 1:
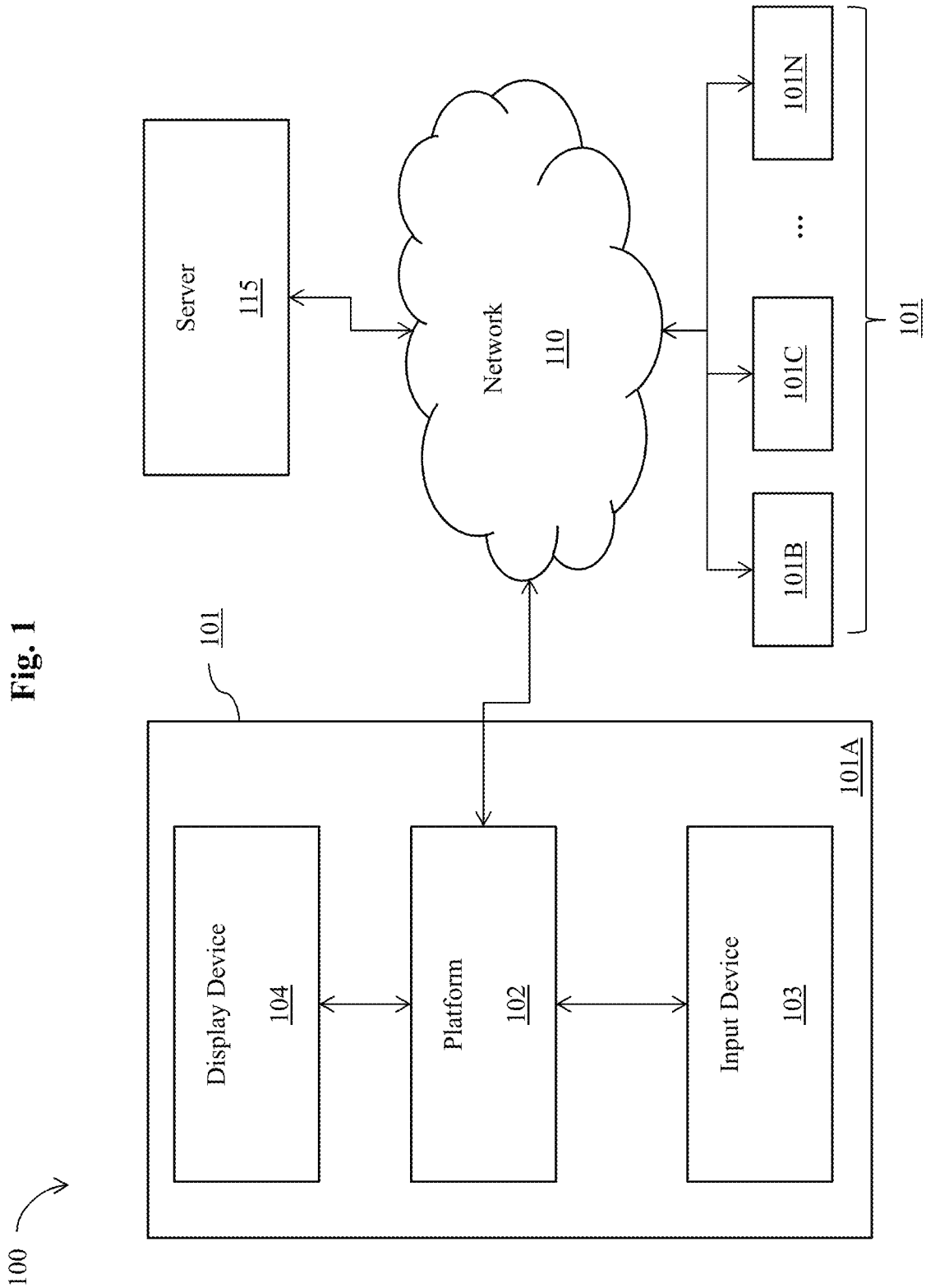
FIG. 1 is an exemplary top-level block diagram illustrating one embodiment of a network multiplayer gaming environment including at least one peer device.

Turning to FIG. 1, the session management system 100 is implemented between a network 110 (e.g., cloud) comprising a server 115 (e.g., a single server machine, multiple server machines, and/or a content delivery network) communicating with a plurality of player consoles 101 (shown as any number of player consoles 101A-101N). A player console 101 can be any system with a processor, memory, capability to connect to the network, and capability of executing gaming software in accordance with the disclosed embodiments. A hardware and network implementation suitable for the disclosed system is described in greater detail in commonly assigned application Ser. No. 13/894,099, entitled "System and Method for Network Gaming Architecture," incorporated herein by reference.

The player console 101A is shown in further detail for illustration purposes only. As shown, the player console 101 can include any number of platforms 102 in communication with an input device 103. For example, the platform 102 can represent any biometrics, motion picture, video game, medical application, or multimedia platform as desired. According to one embodiment disclosed herein, the platform 102 is a gaming platform for running game software and various components in signal communication with the gaming platform 102, such as a dedicated game console including an XBOX One® manufactured by Microsoft Corp., PLAYSTATION 4® manufactured by Sony Corporation, and/or WII U® manufactured by Nintendo Corp. In other embodiments, the platform 102 can also be a personal computer, laptop, tablet computer, or a handheld mobile device. One or more players can use a gaming platform to participate in a game. Multiple gaming platforms may be linked together locally (e.g., via a LAN connection), or via the network 110 (e.g., the Internet or other communication networks).

The network 110 can also include any number of wired data networks and/or any conventional wireless communication network, for example, radio, Wireless Fidelity (Wi-Fi), cellular, satellite, and broadcasting networks. Exemplary suitable wireless communication technologies used with the network 110 include, but are not limited to, Global System for Mobile Communications (GSM), General Packet Radio Service (GPRS), Code Division Multiple Access (CDMA), Wideband CDMA (W-CDMA), CDMA2000, IMT Single Carrier, Enhanced Data Rates for GSM Evolution (EDGE), Long-Term Evolution (LTE), LTE Advanced, Time-Division LTE (TD-LTE), High Performance Radio Local Area Network (HiperLAN), High Performance Radio Wide Area Network (HiperWAN), High Performance Radio Metropolitan Area Network (HiperMAN), Local Multipoint Distribution Service (LMDS), Worldwide Interoperability for Microwave Access (WiMAX), ZigBee, Bluetooth, Flash Orthogonal Frequency-Division Multiplexing (Flash-OFDM), High Capacity Spatial Division Multiple Access (HC-SDMA), iBurst, Universal Mobile Telecommunications System (UMTS), UMTS Time-Division Duplexing (UMTS-TDD), Evolved High Speed Packet Access (HSPA+), Time Division Synchronous Code Division Multiple Access (TD-SCDMA), Evolution-Data Optimized (EV-DO), Digital Enhanced Cordless Telecommunications (DECT) and others.

The platform 102 typically is electrically coupled to a display device 104. For example, the display device 104 can be an output device for presentation of information from the platform 102 and includes a television, a computer monitor, a head-mounted display, a broadcast reference monitor, a medical monitor, the screen on a tablet or mobile device, and so on. In some embodiments, the platform 102 and/or the display device 104 is in communication with an audio system (not shown) for presenting audible information.

In FIG. 1, the platform 102 also is electrically or wirelessly coupled to one or more controllers or input devices, such as an input device 103. In some embodiments, the input device 103 is a game controller and includes keyboards, mice, gamepads, joysticks, directional pads, analog sticks, touch screens, and special purpose devices (e.g., steering wheels for driving games and/or light guns for shooting games). Additionally and/or alternatively, the input device 103 includes an interactive-motion-tracking system, such the Microsoft Xbox One KINECT® device or the Sony PlayStation 4 Camera®, for tracking the movements of a player within a 3-dimensional physical space. The input device 103 provides data signals to the platform 102, which processes the data and translates the player's movements on the display device 104. The platform 102 can also perform various calculations or operations on inputs received by the sensor and instruct the display to provide a visual representation of the inputs received as well as effects resulting from subsequent operations and calculations.

In one embodiment, the platform 102 can be connected via the network 110 to the server 115 that can host, for example, multiplayer games and multimedia information (e.g., scores, rankings, tournaments, and so on). Users can access the server 115 when the platform 102 is online via the network 110. Reference herein to the platform 102 can include gaming platforms executing video game software or game software (e.g., computer program products, tangibly embodied in a computer-readable storage medium). Additionally and/or alternatively, references to the platform 102 can also include hardware only, or a combination of hardware and/or software. In some embodiments, the platform 102 includes hardware and/or software, such as a central processing unit, one or more audio processors, one or more graphics processors, and one or more storage devices.

In some embodiments, a selected player console 101A-N directly communicates with other player consoles of the session management system 100 via the network 110. When data (e.g., game information) is exchanged without the central server 115, the session management system 100 can operate as a peer-to-peer network. In some cases, such as for a video game, a selected player console 101 only can support a very limited, relatively small number of players in a single session. However, any number of sessions can exist in any multiplayer game.

Figure 2:
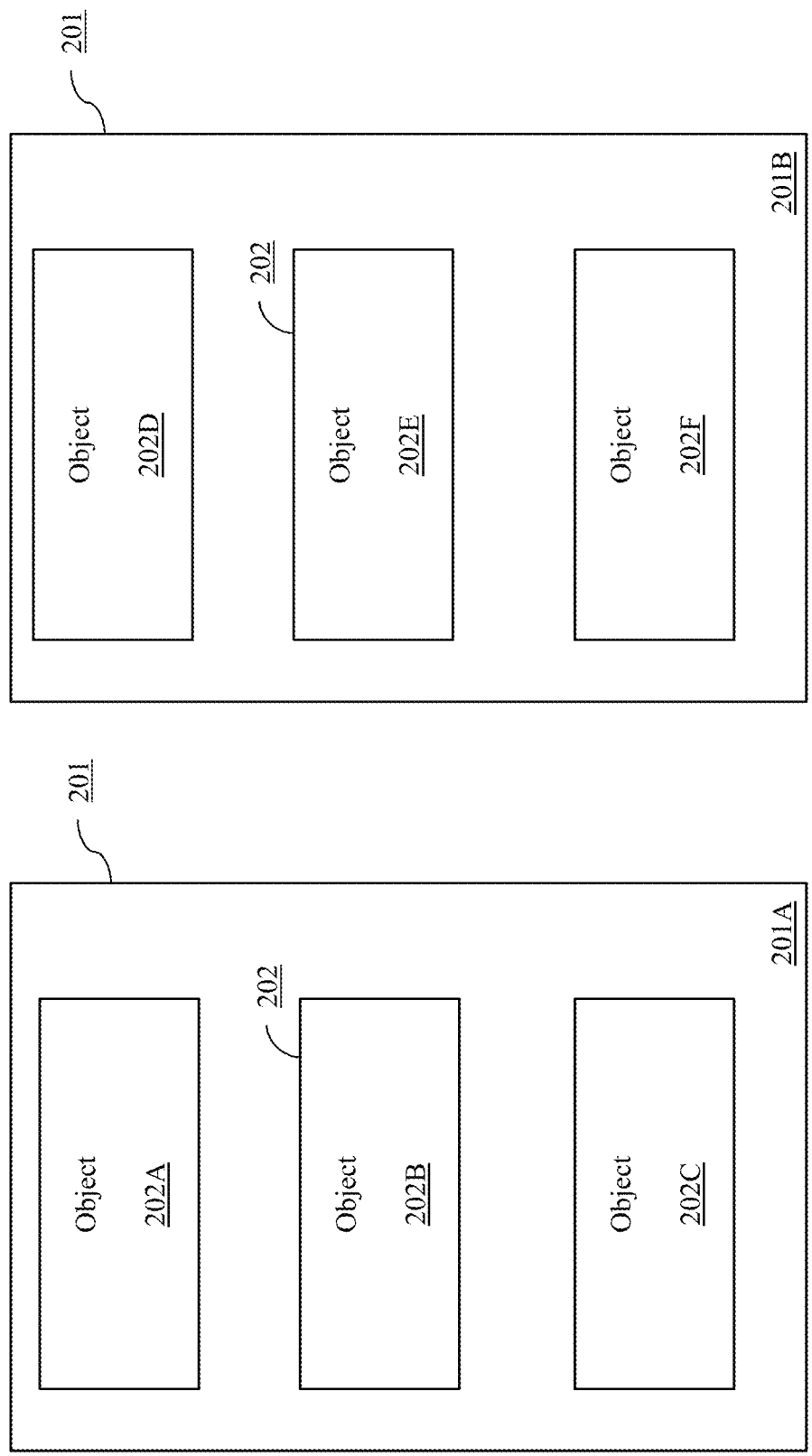
FIG. 2 is an exemplary top-level block diagram illustrating one embodiment of a virtual world of a multiplayer game using the network multiplayer gaming environment of FIG. 1.

For example, turning to FIG. 2, one or more sessions 201 can exist in a single video game. As shown, a first session 201A and a second session 201B can represent one or more objects 202 (e.g., virtual players, objects, virtual areas, and so on) in the same virtual world of the video game. Although two sessions 201 are shown for illustration purposes only, the video game can include any number of sessions 201, each session supporting one or more objects 202. The first session 201A supports objects 202A, 202B, and 202C. In one example, the objects 202A and 202B can represent a virtual player and a token used in the game, respectively. Similarly, the second session 201B supports objects 202D, 202E, and 202F. In some embodiments, the objects 202 of the first session 201A are unique from the objects 202 of the second session 201B. For instance, the objects 202A, 203B, and 204B can represent three unique players in the same virtual world of the first session 201A.

As previously discussed, in conventional multiplayer network systems, when virtual players (e.g., objects 202A and 202B) begin to congregate in the same virtual area of a map, for example, there may be a disconnect between players in different sessions. Stated in another way, the same objects 202 will not exist across different sessions (e.g., objects 202 in a first session 201A may not exist in the second session 201B). This can cause players to feel as if their virtual world is disconnected from the rest of the game. Advantageously, the session management system 100 dynamically manages sessions 201 by allowing players from different sessions— but in the same virtual area of the map, for example—to be merged into a single session. This allows players from previously different sessions to come across one another, thereby, making the virtual world seem more populated. As an additional advantage, seamless session merging handles many network failures silently. In prior art systems, a player who loses network connectivity can be kicked out of a session and may not be able to rejoin (because they are in a session by themselves). However, the session management system 100 allows for a disconnected player to exist in a session by themselves for a predetermined period before they are reconnected to the remaining players in the session or can be joined with another session.

With reference now to FIG. 3A, an exemplary method 3000 for seamless session management is shown. The method 3000 begins with monitoring a triggering event (step 3010). In some embodiments, the triggering event defines when (step 3020) to merge two sessions 201 or split a single session 201. For example, when the object 202A (e.g., virtual players) in the same session 201A move physically apart from another the object 203A by a predetermined virtual distance, this triggers (step 3010/3020) the session management system 100 to split the session 201A (step 3040) into two different sessions. Likewise, if objects 202 from two different sessions 201 (e.g., the objects 202A and 202D) are within a predetermined virtual distance from one another, the session management system 100 can merge the sessions 201A and 201B (step 3030) to allow interaction between objects 202 of the respective sessions 201. Other examples of the triggering event being monitored in step 3010 includes, but is not limited to, a change in a player/ objects position/visibility, players leaving/entering the virtual/game world (e.g., starting or ending a game), players inviting each other to a game session, game based triggers (e.g., ending/starting a mission), completing a "start-of-game" tutorial (i.e., merging players with the general game population after introduction without interference from other players), administratively removing players (e.g., moving players from one session to another), temporary loss of connectivity, virtual geography, team management, networking resources, social relationships (e.g., friends, friends of friends, recent players, groups), spoken language, skill level, matchmaking rating (MMR), game modes (for example, a player can be on a mission to follow another player), player housing, and so on.

Figure 3B:
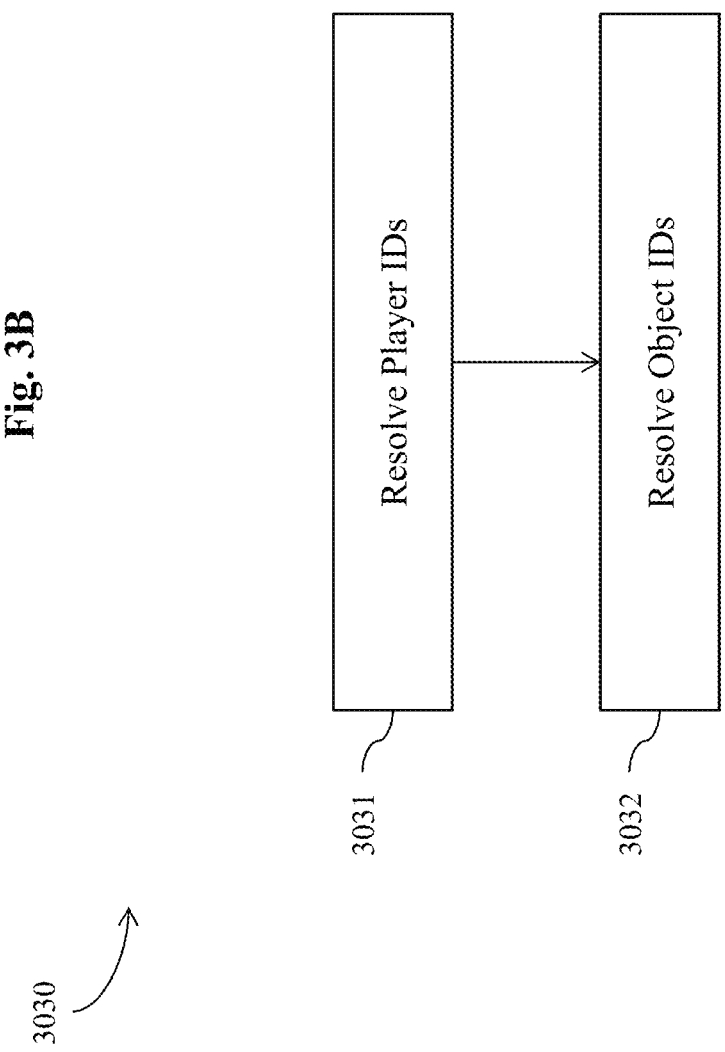
FIG. 3B is flow chart outlining the merge process of the session management flow chart of FIG. 3A.

In a preferred embodiment as shown in FIG. 3B, the process for merging (step 3030) includes two phases: (1) resolving player IDs (step 3031); and (2) resolving object IDs (step 3032). This two-step process advantageously ensures that the players in the merged session have common object identifiers for all world objects. This allows players to communicate information about object state, e.g., I am giving you object X, and so on. This need to communicate object state favors shorter object IDs to reduce data transmission volumes. This is because object state data should be transmitted as quickly as possible (ideally all in one IP packet) to avoid latency (delay) issues. These constraints necessitate short object IDs. This results in the potential that different players will have conflicting object IDs. During a merge, these conflicts in object IDs need to be resolved. One option for resolving these id conflicts would be to just change conflicting object IDs throughout one player's instance of the game, i.e., change private IDs (discussed below). However, object IDs are often replicated throughout a game's code base for various purposes. Renaming IDs throughout the entire game would be time consuming and likely to introduce bugs or errors.

Turning to FIG. 4, an exemplary process 3031 for resolving player IDs is shown in further detail. As an initial matter, each player console 101 (or peer in the peer-to-peer system) represents a single player with a single player ID. Accordingly, in some embodiments, the central server 115 can maintain a public player index (step 4010), which can identify the currently assigned player ID for each player of a selected player console 101. In an alternative embodiment, each player console 101 can maintain a local copy of the public player index to reduce any need for a "central server" in a peer-to-peer system. For each player console 101 that is to be merged, a new unique player ID is assigned that avoids any conflicts (step 4020). In some embodiments, each player console 101 (or each peer) in the merging session broadcasts a message (step 4030) to each player console 101 that is to be merged stating the player console 101 is ready to receive messages using new player IDs in a merged session. For each player console 101 to be merged into the same session, a selected player console 101 replies (step 4040) to each player console 101 that sent a broadcast message in step 4030 that all future communication will use the newly generated player ID list. In other words, when a peer knows another peer is ready to receive new player IDs by way of receiving the broadcasted message from step 4030, the peer replies with a message to that peer indicating that all future communication will use new player IDs. Once all player consoles 101 to be merged have confirmed the new player ID list, all previously used player IDs are cleared (step 4050).

Figure 5:
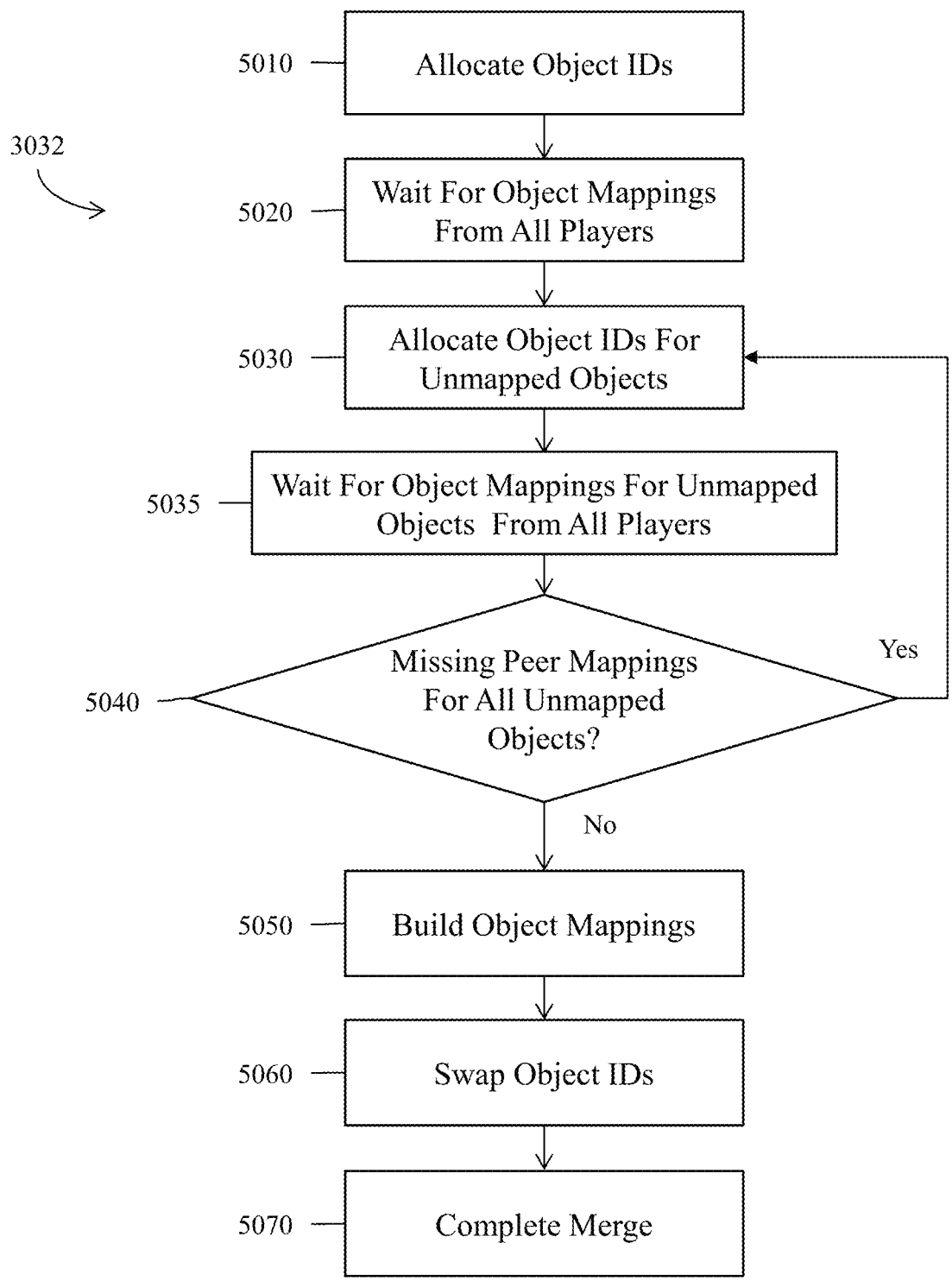
FIG. 5 is flow chart outlining the conflict resolution of object IDs of the merge process of FIG. 3B.

With reference now to FIG. 5, an exemplary process 3032 for resolving object IDs is shown in further detail. Compared to resolving player IDs, resolving for object IDs typically accounts for multiple objects per player console 101. Even further, each player console 101 can be said to "own" a particular object that exists in their session and the session management system 100 therefore must resolve ownership issues of objects between the player consoles 101. In some embodiments, the central server 115 does not resolve any issues related to resolving object IDs. However, in some embodiments, the central server 115 can receive object IDs and resolve object IDs to simplify computational requirements on the server.

The exemplary process 3032 for resolving object IDs begins by waiting for each player console 101 (and each corresponding session 201) to allocate a current ID for any local object in their related session (step 5010). Each player console 101 transmits a copy of their mapping of local objects and object IDs to each player console 101 to be merged. Once all of the player consoles 101 that will be merged has provided their local object ID mapping (step 5020), any object that is left unmapped is allocated an object ID and each player console 101 to be merged is provided a copy of this mapping (step 5030). The session management system 100 then waits for object mappings for unmapped objects for all players (step 5035).

However, as previously discussed, each player console 101 may have a different idea of what is unmapped. For example, not all players know about every object in the virtual game. Each player console 101 also may have an inconsistent/conflicting belief about which player console 101 is responsible for allocating the object ID for a selected object. Therefore, if any object is still unmapped after this step (step 5040), any object that is left unmapped (or each object that a selected player console 101 believes needs to be mapped) is allocated an object ID and each player console 101 to be merged is provided a copy of this mapping (return to step 5030). In the event of an inconsistent/conflicting belief about which player console 101 is responsible for allocating the object ID, a predetermined priority of player consoles can be used to determine which object ID is used. For example, priority can be based on lower object IDs, account IDs, lexicographic ordering of user names, Internet Protocol (IP) addresses, random, and/or any ordering can be used as long as each player console 101 follows the same ordering. Once all objects in the sessions to be merged have been mapped, a new public object ID is assigned to each object and a "ready" message is sent to all player consoles 101 to be merged (step 5050). Once all player consoles 101 to be merged have built their new object mappings, the current IDs are swapped with the generated public object IDs (step 5060) to complete the merge (step 5070).

In one embodiment, a lookup table is used to translate common public IDs to client-local private IDs. Similarly, the lookup table (or a separate lookup table) can be used to translate public player IDs as discussed above with reference to FIG. 4. When communicating information about object state from one player to other peers the common public object ID is used. Translation is accomplished via the look up table. In yet another embodiment, object IDs are uniquely assigned based on a larger number (e.g., more digits) such that each object ID is guaranteed to be globally unique. For example, in some embodiments, a 64-bit number or a 128-bit number can be used for each object ID to guarantee a universally unique identifier. In some embodiments, to guarantee a universally unique identifier for an object ID, a player ID or session ID can be used as a prefix for the object ID to further limit the replication of object ID's across player sessions. Finally, in an additional embodiment, the server 115 tracks the IDs that are in-use and provides a set of unused IDs to clients.

During a merge, one session is deemed the receiving session and the other is the merging session. In some embodiments, selecting the receiving session from one or more sessions includes comparing the session ID of each session. The session ID that is the lowest (in value) can be used as the receiving session for receiving all other merging sessions. In other embodiments, the session management system 100 cannot remap an ID for a selected session. For example, when remapping objects, a selected session may include newly created objects and objects that are undergoing an ownership change. This selected session can be marked as "unable to merge." However, the selected session can be the receiving session. In even further embodiments, a selected session that is the largest session (most participants/objects) is preferably selected as the receiving session to reduce the number of conflicts, ID changes, negotiation/network traffic. For example, with reference to FIG. 2, the first session 201A can be designated the merging session and the second session 201B can be designated the receiving session. In the event that the session management system 100 is merging more than two sessions, one session is deemed the receiving session and all others are the merging sessions. Object IDs in the receiving session will stay the same. IDs in the merging session will need to be changed to resolve conflicts. By way of example, assume the two sessions have the correlation between objects 202 and IDs as shown in FIG. 6A.

Upon merging there will be a conflict as to the object ID 3 (i.e., object 202C and object 202D) between the two sessions 201A, B. The merging session 201A will not be able to use the public ID 3 to represent object 202C because public ID 3 already is used in the receiving session 201B for object 202D. The two sessions 201A, B will recognize the conflict and the receiving session 201B will provide the merging session 201A with a notification of available public IDs. Accordingly, the merging player will re assign the public ID for object 202C to 6 and the tables are shown in FIG. 6B after the merge is complete.

In yet another embodiment, the session 201A can generate non-conflicting private IDs for objects 202D, 202E, and 202F. An example of the tables are shown in FIG. 6C after the merge is complete.

In some embodiments, the session management system 100 can also split any number of sessions. As discussed, for example, when the object 202A (e.g., virtual players) in the same session 201A move physically apart from another the object 203A by a predetermined virtual distance, this triggers the session management system 100 to split the session 201A into two different sessions. As an additional example, the session management system 100 accounts for unexpected network problems for a particular user or when a player abruptly disconnects and leaves a session. In some embodiments, during a session split, the selected peer to be split off from the active session can sever their connection to the other peers (or other player consoles 101). This causes one session to become one or more sessions. Every object that is known by any of the peers in the (new or old) session will exist in the newly split sessions. In some embodiments, this includes duplicating objects across multiple sessions. In other words, this session split can be handled as disconnecting from a session. For example, if two players are in the same session and both players see a car, a player who owned the car and disconnected from the session, the remaining player can take ownership of the car because the original owner has been removed. In this event, tables/IDs discussed above do not need to change. In some embodiments, when a player who split off from a session wishes to join a new session, that player must clear their previously known objects before they can be reintroduced to the general player population. In other embodiments, splitting a session is disallowed if it would cause duplicated objects. For example, once a session is split, there can be two sessions, each with their own distinct copy of an object. Avoiding this split can avoid players that intentionally duplicate valuable objects to exploit virtual game economics. If these two sessions were to later merge, there can then be two identical objects in the same session. In this manner, the session management system 100 advantageously avoids object duplication when two players are merged following a split.

By way of another example, with reference now to FIG. 7A-7F, the exemplary process 3032 for resolving object IDs is shown in further detail. Here, the first session 201A can be designated the receiving session and the second session 201B can be designated the merging session. Turning to FIG. 7A, the two sessions each include objects 202 and IDs as shown in FIG. 7A. As shown, the first session 201A can include an object 202A with a single player of a player console 101A. The second session 201B can include four objects 202B, 202C, 202D, and 202D with two participating player consoles 101B and 101C.

As discussed, each player console 101 can be said to "own" a particular object that exists in their session and the session management system 100 therefore must resolve ownership issues of objects between the player consoles 101. In this example, the player console 101B knows of objects 202B-E and believes it "owns" objects 202B and 202D. Similarly, the player console 101C knows of objects 202C-E (and does not know of object 202B) and believes it "owns" objects 202C and 202D. Neither player console 101B, C believes it "owns" object 202E.

The exemplary process 3032 for resolving object IDs begins by waiting for each player console 101 (and each corresponding session 201) to allocate a current ID for any local object in their related session (step 5010). In this example, the new player consoles 101B and 101C through communication with the player console 101A will derive "new" IDs that are unique. For example, the player console 101B can receive new object IDs 2000, 2001, 2002, 2003, and 2004. The player console 101C can receive new object IDs 3000, 3001, 3002, 3003, and 3004.

Each player console 101 transmits a copy of their mapping of local objects and object IDs to each player console 101 to be merged. In this example, and as shown in FIG. 7B, the player console 101B maps objects 202B and 202D as it believes it "owns" these two objects. The player console 101B will not map objects 202C and 202E. The player console 101C maps object 202C and 202D as it believes it "owns" these two objects. The proposed new player IDs are shown in FIG. 7B. As shown, both peers provide conflicting mappings for the object 202D while neither player console provides a mapping for the object 202E.

Once all of the player consoles 101 that will be merged have provided their local object ID mapping (step 5020), any object that is left unmapped is allocated an object ID and each player console 101 to be merged is provided a copy of this mapping (step 5030). In this example, the only unmapped object is the object 202E. Therefore, as shown in FIG. 7C, the player console 101B suggests mapping the object 202E with the object ID 2002; the player console 101C suggests mapping the object 202E with the object ID 3002. Again, these are conflicting mappings.

The session management system 100 then waits for object mappings for unmapped objects for all players (step 5035). However, as previously discussed, each player console 101 may have a different idea of what is unmapped as shown in FIG. 7C. In some embodiments, in the event of a conflict as shown here, the mapping generated by the player with a lower player index is used. However, as described above, any ordering can be used. For exemplary purposes only, the player console 101B has the lower player index compared to the player console 101C. Accordingly, the conflicts will be resolved by using the proposed object IDs from the player console 101B, as shown in FIG. 7D.

If any object is still unmapped after this step (step 5040), any object that is left unmapped is allocated an object ID and each player console 101 to be merged is provided a copy of this mapping (return to step 5030). Once all objects in the sessions to be merged have been mapped, a new public object ID is assigned to each object and a "ready" message is sent to all player consoles 101 to be merged (step 5050). In the example shown in FIGS. 7A-F, the following mapping for the incoming session 201B can be used to merge the sessions 201A, B:

| Private ID | Public ID |
|---|---|
| 1000 | 2000 |
| 2000 | 1000 |
| 1001 | 3000 |
| 3000 | 1001 |
| 1002 | 2001 |
| 2001 | 1002 |
| 1003 | 2002 |
| 2002 | 1003 |

Once all player consoles 101 to be merged have built their new object mappings, as shown in FIG. 7E, the current IDs are swapped with the generated public object IDs (step 5060) to complete the merge (step 5070), as shown in FIG. 7F. Turning to FIG. 7F, once the merge is complete, the player consoles 101A, 101B, and 101C can now communicate freely using common public IDs. For example, from the player console 101, the object that is known publically as object 1000 is known by the private ID of object 1000. The object that is known publically as object 2000 is known privately as object 2000. Similarly, for either of the player consoles 101B or 101C, the object that is known publically as object 2000 is known by the private ID of object 1000.

The object that is known publically as object 1000 is known privately to that client as object 2000.

The session management system 100 advantageously selects sessions where there are no conflicts, or the conflicts can be resolved in any of the methods described herein. Accordingly, the session management system 100 provides the appearance of sharing the same space with many players without limitation on the geometry of the virtual world. Additionally, because session management system 100 does not require the full game state to be simulated by the server, much less computational resources are required. For example, the session management system 100 maintains a minimal subset of the game state (e.g., player positions, velocity, volume locks, session locks, and so on). Game state information that is not necessary for choosing a session (e.g., player health, weapons, running scripts, and so on) need not be managed for purposes of session management and additional resources can be freed up for session-based computations. Advantageously, the server need only be concerned about a number of small individual sessions as well as the information relevant to merging/splitting sessions to provide the illusion of a single-larger session. In fact, the session management system 100 scales like a small-session system and provides users with the feel of a large-session virtual environment.

The entirety of this disclosure (including the Cover Page, Title, Headings, Field, Background, Summary, Brief Description of the Drawings, Detailed Description, Claims, Abstract, Figures, and otherwise) shows by way of illustration various embodiments in which the claimed inventions may be practiced. The advantages and features of the disclosure are of a representative sample of embodiments only, and are not exhaustive and/or exclusive. They are presented only to assist in understanding and teach the claimed principles. It should be understood that they are not representative of all claimed inventions. As such, certain aspects of the disclosure have not been discussed herein. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principles of the invention and others are equivalent. Thus, it is to be understood that other embodiments may be utilized and functional, logical, organizational, structural and/or topological modifications may be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For instance, it is to be understood that the logical and/or topological structure of any combination of any program modules (a module collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the invention, and inapplicable to others. In addition, the disclosure includes other inventions not presently claimed. Applicant reserves all rights in those presently unclaimed inventions including the right to claim such inventions, file additional applications, continuations, continuations in part, divisions, and/or the like thereof. As such, it should be understood that advantages, embodiments, examples, functional, features, logical, organizational, structural, topological, and/or other aspects of the disclosure are not to be considered limitations on the disclosure as defined by the claims or limitations on equivalents to the claims.

What is claimed is:

1. A method for seamless session management comprising:

monitoring a video game for a triggering event, the video game being executed in one or more data network sessions, each data network session for hosting at least one player console participating in the video game identified by a player identification, and each data network session including at least one object having an object identification, wherein player consoles within a selected network session can communicate with each other in the video game, and player consoles from a first network session cannot communicate with player consoles from a second network session in the video game;

determining whether to merge the first network session and the second network session based on the monitored triggering event for allowing the player consoles of the first and second network sessions to communicate with each other; and determining whether to split the selected network session based on the monitored triggering event to prevent the player consoles of the selected network session to communicate with each other; and at least one of merging the first network session and the second network session, and splitting the selected network session based on said determined merge or split, wherein said merging and splitting comprises resolving player identifications and resolving object identifications during gameplay of the video game, said resolving object identifications comprises:

allocating object identifications via each player console to be merged for each object in the network session of the selected player console;

transmitting a copy of the allocated object identifications to each player console to be merged;

waiting for object mappings from all player consoles;

allocating object identifications for unmapped objects;

assigning a new public object identification for all objects of each player console to be merged, wherein the public object identifications do not conflict with one another;

building object mappings based on the assigned new public object identifications; and swapping said allocated object identifications.

2. The method of claim 1, wherein said building object mappings comprises generating a lookup table.

3. The method of claim 1, wherein said resolving object identifications further comprises:

providing object identifications via each player console to be merged to a central server for each object in the network session; and receiving a new public object identification for all objects of each player console to be merged from the central server, wherein the new public object identification for all objects do not conflict with one another.

4. The method of claim 1, wherein object identifications are universally unique.

5. The method of claim 4, wherein object identifications are at least 64-bits to avoid object identification conflicts.

6. The method of claim 4, wherein object identifications comprise a portion of a player identification to avoid object identification conflicts.

7. The method of claim 1, wherein player identifications are universally unique.

8. The method of claim 7, wherein player identifications are at least 64-bits to avoid player identification conflicts.

9. The method of claim 1, wherein said monitoring the video game for the triggering event comprises monitoring at least one of an object from the first network session moving geographically closer by a predetermined distance in a virtual world to a second object from the second network session, the object from the first network session moving geographically farther by the predetermined distance in the virtual world from another object from the first network session, a change in player visibility in the virtual world, players leaving or ending the video game, players inviting each other to a video game session, and game based triggers.

10. A session management system comprising:
one or more first player consoles for executing a video game in a first network session, said first network session including at least one object having an object identification and for enabling communication among the first player consoles over a data network;
one or more second player consoles for executing the video game in a second network session, said second network session including at least one object having a second object identification and for enabling communication among the second player consoles over the data network; and
a server for monitoring a triggering event to merge the first and the second network sessions, thereby enabling communication between the first player consoles and the second player consoles over the data network, wherein said merging comprises resolving player identifications and resolving object identifications during gameplay of the video game, said resolving object identifications comprises:
allocating object identifications via each player console to be merged for each object in the network session of the selected player console;
transmitting a copy of the allocated object identifications to each player console to be merged;
waiting for object mappings from all player consoles;
allocating object identifications for unmapped objects;
assigning a new public object identification for all objects of each player console to be merged, wherein the public object identifications do not conflict with one another;
building object mappings based on the assigned new public object identifications; and
swapping said allocated object identifications.

11. The system of claim 10, wherein said server further provides all object identifications to avoid object identification conflicts while merging the first and second network sessions.

12. The system of claim 11, wherein said server further monitors at least one of an object from the first network session moving geographically closer by a predetermined distance in a virtual world to a second object from the second network session, the object from the first network session moving geographically farther by the predetermined distance in the virtual world from another object from the first network session, a change in player visibility in the virtual world, players leaving or ending the video game, players inviting each other to a video game session, and game based triggers.

13. The system of claim 10, wherein said server further prevents the split of the first session when a selected object of the first session needs to be duplicated to complete the split.

14. The system of claim 10, wherein said server further provides all player identifications to avoid player identification conflicts while merging the first and second network sessions.

15. A computer program product for seamless session management, the computer program product including a non-transitory computer readable storage medium having program instructions embodied therewith, the program instructions executable by a device to cause the device to perform a method comprising:
monitoring a video game for a triggering event, the video game being executed in one or more data network sessions, each data network session for hosting at least one player console participating in the video game identified by a player identification, and each data network session including at least one object having an object identification, wherein player consoles within a selected network session can communicate with each other in the video game, and player consoles from a first network session cannot communicate with player consoles from a second network session in the video game;
determining whether to merge the first network session and the second network session based on the monitored triggering event for allowing the player consoles of the first and second network sessions to communicate with each other; and
determining whether to split the selected network session based on the monitored triggering event to prevent the player consoles of the selected network session to communicate with each other; and
at least one of merging the first network session and the second network session, and splitting the selected network session based on said determined merge or split, wherein said merging and splitting comprises resolving player identifications and resolving object identifications during gameplay of the video game, said resolving object identifications comprises:
allocating object identifications via each player console to be merged for each object in the network session of the selected player console;
transmitting a copy of the allocated object identifications to each player console to be merged;
waiting for object mappings from all player consoles;
allocating object identifications for unmapped objects;
assigning a new public object identification for all objects of each player console to be merged, wherein the public object identifications do not conflict with one another;
building object mappings based on the assigned new public object identifications; and
swapping said allocated object identifications.

* * * * *